Sept. 28, 1943.  E. E. BAUER ET AL  2,330,544
AUTOMATIC RECLOSING CIRCUIT BREAKING SYSTEM
Filed Feb. 3, 1942
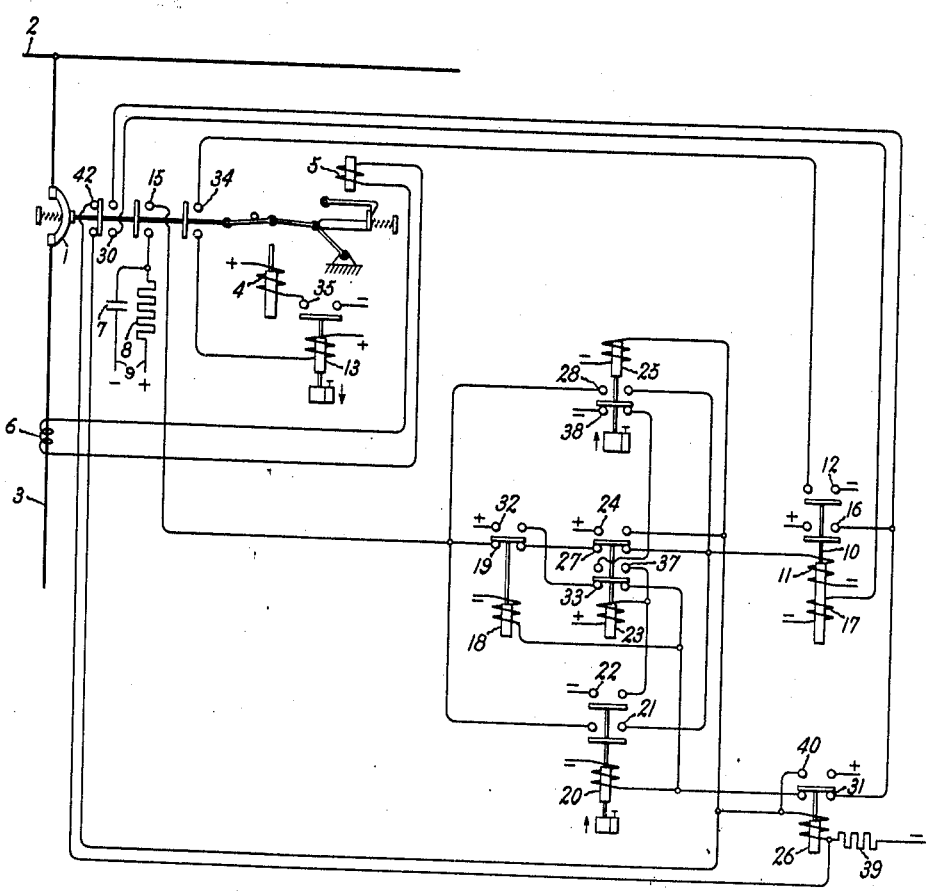
Inventors:
Edward E. Bauer,
Anton W. Fraps,
by Harry E. Dunham
Their Attorney.

Patented Sept. 28, 1943

2,330,544

UNITED STATES PATENT OFFICE 2,330,544

AUTOMATIC RECLOSING CIRCUIT BREAKING SYSTEM

Edward E. Bauer, Philadelphia, and Anton W. Fraas, Upper Darby, Pa., assignors to General Electric Company, a corporation of New York Application February 3, 1942, Serial No. 429,416

5 Claims. (Cl. 175—294)

Our invention relates to automatic reclosing circuit breaking systems and particularly to such systems in which, in case of a permanent fault, a circuit breaker is automatically reclosed a predetermined number of times with predetermined time intervals between each opening of the circuit breaker and the next reclosure thereof.

One object of our invention is to provide a new and improved arrangement of apparatus for effecting, in case of a permanent fault, an instantaneous first reclosure of the circuit breaker and a predetermined number of subsequent time delayed reclosures before the circuit breaker is permanently locked out.

Our invention is an improvement in the arrangement disclosed in United States Letters Patent 2,059,836 granted November 3, 1936, and assigned to the same assignee as this application whereby each opening of the circuit breaker causes a charged condenser to be discharged through a suitable relay, which in turn is arranged to effect the reclosure of the circuit breaker.

Our invention will be better understood from the following description when taken in connection with the accompanying drawing, the single figure of which diagrammatically illustrates an automatic reclosing circuit breaking system embodying one embodiment of our invention, and the scope of our invention will be pointed out in the appended claims.

Referring to the drawing, 1 represents a circuit breaker which connects an alternating current supply circuit 2 to an alternating current load circuit 3. The circuit breaker 1 may be of any suitable type, examples of which are well known in the art. As shown in the drawing, the circuit breaker is of the well-known trip-free latched-in type comprising a closing coil 4 and a trip coil 5 whereby a predetermined energization of the trip coil 5 effects the opening of the circuit breaker irrespective of the energization of the closing coil 4 and the circuit breaker is prevented from being closed again until after the closing coil 4 has been deenergized.

Any suitable fault-responsive means may be provided for effecting the opening of the circuit breaker 1 when a fault occurs on the load circuit 3. For accomplishing this result, we have shown the trip coil 5 as being connected in series relation with the load circuit 3 by means of a current transformer 6. The trip coil 5 is arranged so that it cannot effect the opening of the circuit breaker 1 until a predetermined abnormal current flows through the load circuit 3.

For effecting the reclosure of the circuit breaker 1 when it is opened in response to a fault on the load circuit 3, we provide a condenser 7, which is shown permanently connected to a suitable source of direct current 9 with a relatively high resistance 8 connected in series therewith. The resistance 8 is so designed that it permits the condenser 7 to be charged at a predetermined rate. 10 represents a relay having an operating winding 11, which is arranged to be connected across the condenser 7 whenever it is desired to reclose the circuit breaker 1. The closing of the contacts 12 of the relay 10, whenever the circuit breaker 1 is open, completes an energizing circuit for a control relay 13, which when energized completes an energizing circuit for the closing coil 4 of the circuit breaker 1.

In response to the initial opening of the circuit breaker 1, when a fault occurs on the load circuit 3, an energizing circuit for the operating coil 11 of the relay 10 is immediately completed across the condenser 7 so that an immediate reclosure of the circuit breaker 1 is effected by the closing of the contacts 12 of the relay 10. At the same time, the closing of the contacts 16 of the relay 10 effects the completion of an energizing circuit for a holding winding 17 of the relay 10 through the contacts 30 of the circuit breaker 1 so as to insure that the relay 10 remains in its energized position until the circuit breaker 1 is closed. The closing of the contacts 16 of the relay 10 also effects the energization of an associated control relay 18 so that it opens its contacts 19 in the original energizing circuit of the operating winding 11 of the relay 10 in order to prevent this energizing circuit from being completed in case the circuit breaker 1 is opened immediately after its first reclosure. The opening of the contacts 19 also allows the condenser 7 again to be recharged by the source 9.

The next reclosure of the circuit breaker 1, in case the fault is of such a character that it effects an opening of the circuit breaker within a predetermined time after the first reclosure thereof, is effected by means of a time relay 20 closing its contacts 21 in an energizing circuit for the operating winding 11 of the relay 10 across the condenser 7. The time relay 20, which preferably has an adjustable operating time, is so connected that it is set into operation at the time of the first reclosure. The closing of the contacts 22 of the time relay 20 effects the energization of an associated control relay 23, which by closing its contacts 24 effects the energization of an associated time relay 25, which preferably has an adjustable operating time, and an associated control relay 26. By opening its contacts 27, the relay 23 prevents the operating coil 11 of the relay 10 from being energized in case the circuit breaker 1 is opened immediately after the second reclosure, and allows the condenser 7 to be recharged by the source 9.

The third reclosure of the circuit breaker 1, in case the fault is of such a character that it effects an opening of the circuit breaker 1 within a predetermined time after the second reclosure thereof, is effected by the time relay 25 closing its contacts 28 and thereby completing an energizing circuit for the operating winding 11 of the relay 10 across the condenser 7. In response to the third reclosure of the circuit breaker 1, the relays 23, 25, and 26 are deenergized so as to restore the control devices to their normal conditions. In this manner, the operating winding 11 of the relay 10 is arranged to be immediately connected across the condenser 7 in response to the next opening of the circuit breaker 1. Therefore, if the circuit breaker 1 is opened immediately after the third reclosure so that the operating winding 11 is connected across the condenser 7 before it has had time to become sufficiently recharged after the third reclosure to effect the operation of the relay 10, no further automatic reclosures of the circuit breaker can be effected. However, if the circuit breaker 1 remains closed after the third reclosure for a sufficient length of time to allow the condenser 7 to become fully recharged, the next reclosure of the circuit breaker 1 will occur immediately after the next opening thereof and the arrangement will proceed through at normal sequence of operation.

The operation of the arrangement shown in the drawing is as follows: When the circuit breaker 1 is closed so that the auxiliary contacts 15 thereof are open, the condenser 7 is charged at a rate dependent upon the size of the resistance 8 and the capacity of the condenser 7. After the circuit breaker 1 has remained closed for a predetermined time, the condenser 7 becomes fully charged so that the voltage across its terminals is substantially equal to the voltage of the charging source.

It will now be assumed that after the condenser 7 has become fully charged a fault occurs on the load circuit 3 which causes sufficient current to flow through the trip coil 5 to effect the opening of the circuit breaker 1. The closing of the auxiliary contacts 15 of the circuit breaker 1 connects the operating winding 11 of the relay 10, the contacts 27 of the relay 23, and the contacts 19 of the relay 18 in a series circuit across the terminals of the condenser 7 so that the condenser starts to discharge through the relay winding 11. The time it takes the condenser to discharge depends on the constants of the circuit through the relay winding but the relay winding 11 is so designed that the condenser 7 becomes substantially discharged before the winding is disconnected therefrom. The voltage across the condenser 7 at the instant the relay winding 11 is connected in parallel with it is sufficient to cause the relay 10 to close immediately its contacts 12 and 16. By closing its contacts 16, the relay 10 completes an energizing circuit for its holding winding 17 through the auxiliary contacts 30 of the circuit breaker 1. The closing of the contacts 16 of the relay 10 also completes through contacts 31 of the relay 26 energizing circuits for the control relay 18 and the time relay 20. By closing its contacts 32, the relay 18 completes through the contacts 33 of the relay 23 a locking circuit for itself and another energizing circuit for the time relay 20. By opening its contacts 19, the relay 18 opens the original energizing circuit of the relay winding 11 so that this relay winding cannot be immediately re-energized in case the circuit breaker 1 opens immediately after the first reclosure thereof, and so that the condenser 7 is again recharged by the source 9.

By closing its contacts 12, the relay 10 completes through the auxiliary contacts 34 on the circuit breaker 1 an energizing circuit for the control relay 13, which in turn by closing its contacts 35 completes an energizing circuit for the closing coil 4 to effect a reclosure of the circuit breaker 1. The opening of the auxiliary contacts 30 on the circuit breaker 1, when it closes, interrupts the energizing circuit of the holding winding 17 of the relay 10 so that it is restored to its normally deenergized position.

If after its first reclosure the circuit breaker 1 is opened by the trip coil 5 any time before the time relay 20 completes its timing operation, the closing of the contacts 21 of the relay 20, when it completes its timing operation, connects the operating winding 11 of the relay 10 and the auxiliary contacts 15 of the circuit breaker 1 across the condenser 7. The operating time of the time relay 20 is adjusted so that it is longer than the charging time of the condenser 7, and therefore the relay 10 is energized to effect a second reclosure of the circuit breaker 1 in the same manner as it effected the first reclosure.

The closing of the contacts 22 of the time relay 20 completes an energizing circuit for the control relay 23, which by closing its contacts 37 completes a locking circuit for itself through contacts 38 of the time relay 25. By opening its contacts 27, the relay 23 interrupts the initial energizing circuit of the relay winding 11, and by opening its contacts 33, the relay 23 effects the deenergization of the control relay 18 and the time relay 20 so that they are immediately restored to their normally deenergized positions. By closing its contacts 24, the relay 23 completes an energizing circuit for the time relay 25 and also an energizing circuit for the control relay 26 with the resistor 39 in series therewith. By closing its contacts 40, the control relay 26 completes a shunt circuit around the contacts 24 of the relay 23, and by opening its contacts 31, the relay 26 prevents the relays 18 and 20 from being energized in response to the energization of the relay 10.

If after the second reclosure the circuit breaker 1 is opened by the trip coil 5 any time before the time relay 25 completes its timing operation, the closing of the contacts 28 of the relay 25, when it completes its timing operation, connects the operating winding 11 of the relay 10 and the auxiliary contacts 15 of the circuit breaker 1 in series across the condenser 7. The time relay 25 is adjusted so that its timing operation is longer than the charging time of the condenser 7. Therefore, the relay 10 is sufficiently energized to effect the third reclosure of the circuit breaker 1 in the same manner as it effected the first and second reclosures.

The opening of the contacts 38 of the time relay 25 interrupts the holding circuit of the relay 23 so that it is immediately restored to its normally deenergized position. The closing of the auxiliary contacts 42 on the circuit breaker 1 in response to the third reclosure of the circuit breaker completes a shunt circuit around the operating winding of the relay 26 so that this relay becomes deenergized and opens its contacts 40 in its holding circuit and in the energizing circuit of the time relay 25 so that both of the relays 25 and 26 are also restored to their normally deenergized positions.

If the circuit breaker 1 opens after the third reclosure thereof and before the condenser 7 has had time to become recharged, another reclosure of the circuit breaker cannot take place because the closing of the auxiliary contacts 15 of the circuit breaker 1 reconnects the low impedance operating winding 11 of the relay 10 across the condenser 7 and therefore causes the condenser 7 to discharge through the relay winding 11 without effecting the operation of the relay 10. If, however, the circuit breaker 1 remains closed for a sufficient length of time after the third reclosure thereof, the condenser 7 has time to become sufficiently recharged to effect an immediate reclosure of the circuit breaker the next time it is opened.

If the circuit breaker 1 remains closed after either the first or the second reclosure, the time relays 20 and 25 are sequentially operated and then are restored to their normally deenergized positions in the manner heretofore described. The operation of the relay 20 or the relay 25 while the circuit breaker 1 is closed does not effect the energization of the relay 10 because the circuit of the operating winding 11 thereof is opened at the contacts 15 of the closed circuit breaker 1.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. In combination, an electric circuit, a circuit breaker in said circuit, fault responsive means for effecting the opening of said circuit breaker, a normally charged condenser, a relay having a low impedance operating winding, means responsive to a predetermined energization of said relay winding for effecting the closing of said circuit breaker, means responsive to the initial opening of said circuit breaker for effecting the immediate connection of said relay winding across said condenser, timing means having a predetermined timing operation, means responsive to initial energization of said relay winding for effecting the operation of said timing means and the immediate disconnection of said relay winding from across said condenser, means controlled by said timing means and said circuit breaker for effecting the connection of said relay winding across said condenser when said timing means completes its timing operation if said circuit breaker is open at that time, and means for charging said condenser when said relay winding is not connected thereto.

2. In combination, an electric circuit, a circuit breaker in said circuit, fault responsive means for effecting the opening of said circuit breaker, a normally charged condenser, a relay having a low impedance operating winding, means responsive to a predetermined energization of said relay winding for effecting the closing of said circuit breaker, means responsive to the initial opening of said circuit breaker for effecting the immediate connection of said relay winding across said condenser, timing means having a predetermined timing operation, means responsive to initial energization of said relay winding for effecting the operation of said timing means and the immediate disconnection of said relay winding from across said condenser, means controlled by said timing means and said circuit breaker for effecting the connection of said relay winding across said condenser when said timing means completes its timing operation if said circuit breaker is open at that time, a second timing means having a predetermined timing operation, means responsive to said first mentioned timing means completing its timing operation for initiating the timing operation of said second timing means, means controlled by said second timing means and said circuit breaker for effecting the connection of said relay winding across said condenser when said second timing means completes its timing operation if said circuit breaker is open at that time, and means for charging said condenser when said relay winding is not connected thereto.

3. In combination, an electric circuit, a circuit breaker in said circuit, fault responsive means for effecting the opening of said circuit breaker, a normally charged condenser, a relay having a low impedance operating winding, means responsive to a predetermined energization of said relay winding for effecting the closing of said circuit breaker, means responsive to the initial opening of said circuit breaker for effecting the immediate connection of said relay winding across said condenser, timing means having a predetermined timing operation, means responsive to initial energization of said relay winding for effecting the operation of said timing means and the immediate disconnection of said relay winding from across said condenser, means controlled by said timing means and said circuit breaker for effecting the connection of said relay winding across said condenser when said timing means completes its timing operation if said circuit breaker is open at that time, a second timing means having a predetermined timing operation, means responsive to said first mentioned timing means completing its timing operation for initiating the timing operation of said second timing means, means controlled by said second timing means and said circuit breaker for effecting the connection of said relay winding across said condenser when said second timing means completes its timing operation if said circuit breaker is open at that time, means for connecting said relay winding immediately across said condenser in response to the next opening of said circuit breaker after said second timing means has completed its timing operation, and means for charging said condenser when said relay winding is not connected thereto.

4. In combination, an electric circuit, a circuit breaker in said circuit, fault responsive means for effecting the opening of said circuit breaker, a normally charged condenser, a relay having a low impedance operating winding, means responsive to a predetermined energization of said relay winding for effecting the closing of said circuit breaker, means responsive to the initial opening of said circuit breaker for effecting the immediate connection of said relay winding across said condenser and for effecting subsequent connections of said relay winding across said condenser at predetermined time intervals thereafter if at the expiration of each of said time intervals said circuit breaker is open, means for charging said condenser when said relay winding is not connected thereto, holding means for said relay, and means for rendering said holding means operative in response to said predetermined energization of said operating winding and while said circuit breaker is open and for maintaining said holding means operative until said circuit breaker is closed.

5. In combination, an electric circuit, a circuit breaker in said circuit, fault responsive means for effecting the opening of said circuit breaker, a normally charged condenser, a relay having a low impedance operating winding, means responsive to a predetermined energization of said relay winding for effecting the closing of said circuit breaker, means responsive to the initial opening of said circuit breaker for effecting the immediate connection of said relay winding across said condenser, timing means having a predetermined timing operation, means responsive to initial energization of said relay winding for effecting the operation of said timing means and the immediate disconnection of said relay winding from across said condenser, means controlled by said timing means and said circuit breaker for effecting the connection of said relay winding across said condenser when said timing means completes its timing operation if said circuit breaker is open at that time, a second timing means having a predetermined timing operation, means responsive to said first mentioned timing means completing its timing operation for initiating the timing operation of said second timing means, means controlled by said second timing means and said circuit breaker for effecting the connection of said relay winding across said condenser when said second timing means completes its timing operation if said circuit breaker is open at that time, means for charging said condenser when said relay winding is not connected thereto, holding means for said relay, and means for rendering said holding means operative in response to said predetermined energization of said operating winding and while said circuit breaker is open and for maintaining said holding means operative until said circuit breaker is closed.

EDWARD E. BAUER.
ANTON W. FRAPS.